United States Patent [19]

Cassel

[11] 4,261,600
[45] Apr. 14, 1981

[54] PIPE COUPLING FOR LAP JOINTS

[76] Inventor: Thomas R. Cassel, 226 Shirley, Birmingham, Mich. 48009

[21] Appl. No.: 968,229

[22] Filed: Dec. 11, 1978

[51] Int. Cl.³ .............................................. F16L 21/00
[52] U.S. Cl. .................................. 285/177; 29/157 R; 72/392; 285/419; 285/420
[58] Field of Search ............... 285/419, 420, 373, 177, 285/382.4; 29/157 R; 72/392, 355

[56] References Cited

U.S. PATENT DOCUMENTS

| | | | |
|---|---|---|---|
| 1,306,982 | 6/1919 | Walsh | 72/355 |
| 1,910,411 | 5/1933 | Shera | 72/392 X |
| 2,360,054 | 10/1944 | Haas | 72/392 |
| 3,060,994 | 10/1962 | Larsen et al. | 72/392 |
| 3,944,265 | 3/1976 | Hiemstra et al. | 285/373 X |
| 4,049,298 | 9/1977 | Foti | 285/177 |
| 4,056,273 | 11/1977 | Cassel | 285/420 X |
| 4,165,109 | 8/1979 | Foti | 285/420 X |

FOREIGN PATENT DOCUMENTS 2615272 10/1977 Fed. Rep. of Germany ............ 285/419

Primary Examiner—Thomas F. Callaghan
Attorney, Agent, or Firm—Reising, Ethington, Barnard, Perry & Brooks

[57] ABSTRACT

A coupling for a pipe lap joint is disclosed in which a sleeve has a larger diameter at one end and a smaller diameter at the other end with means for stretching the sleeve around the pipes. The sleeve has a radially projecting channel-shaped sector and force applying means engages the sector to stretch the sleeve around the pipes. The channel-shape sector is uniform in cross section along the length of the sleeve and the larger end of the sleeve is axially offset from the smaller end. An improved method for making the pipe coupling is disclosed in which a sleeve blank is disposed in an external die and stretched outwardly by an expanding mandrel.

9 Claims, 17 Drawing Figures

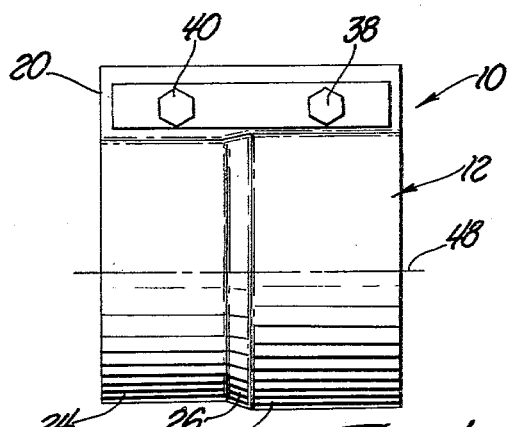
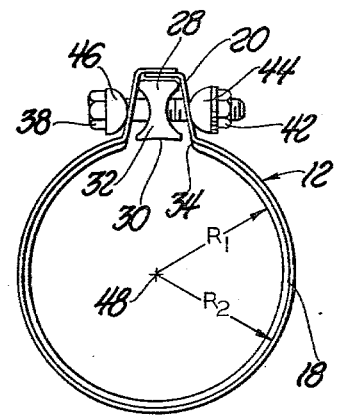
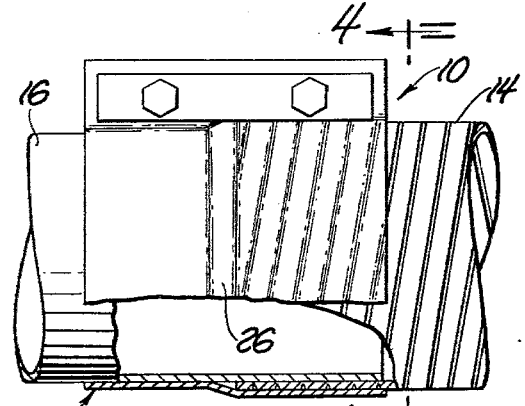
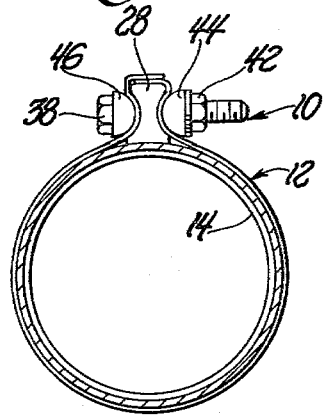
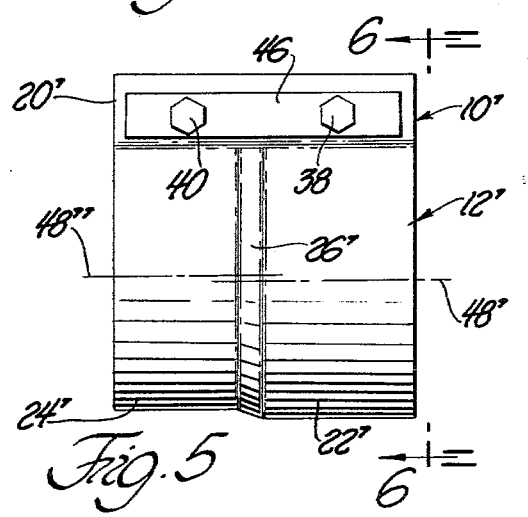
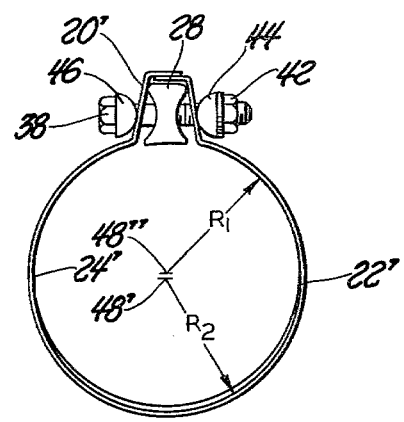

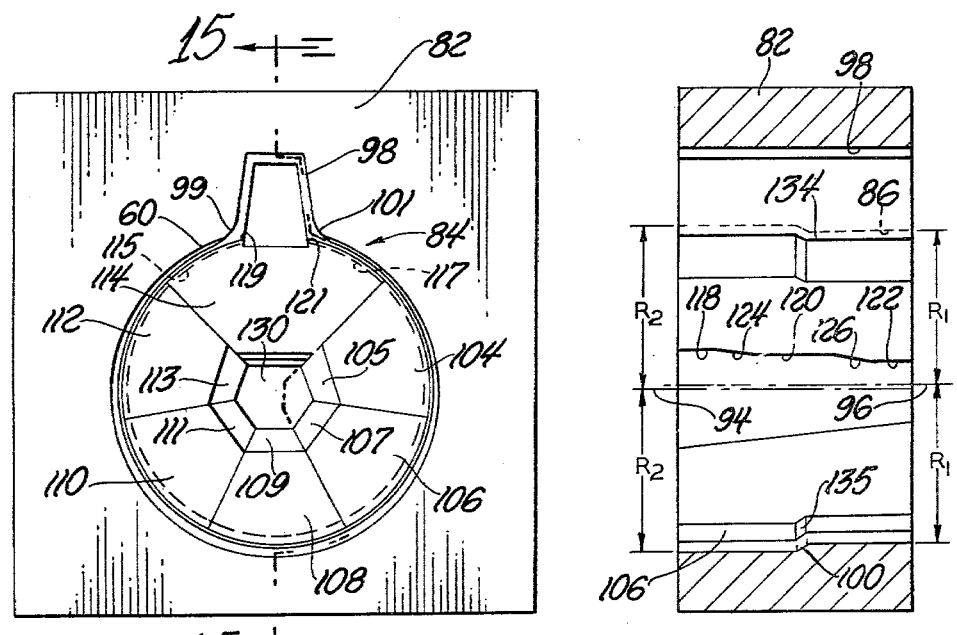
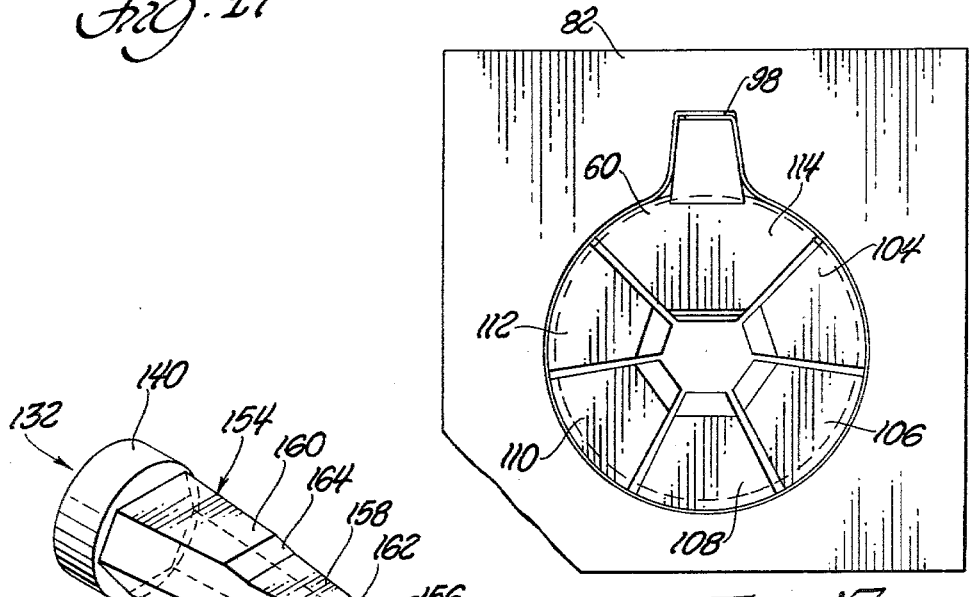

PIPE COUPLING FOR LAP JOINTS

TECHNICAL FIELD

This invention relates to pipe couplings and more particularly it relates to a coupling for pipe lap joints. The pipe coupling of this invention is an improvement upon my pipe couplings disclosed and claimed in U.S. Pat. No. 3,905,623 and U.S. Pat. No. 4,056,273.

There are many applications for pipe couplings where it is desired to couple two pipes together in a strong mechanical connection with a substantially fluid tight seal. An important use of such a coupling is that of joining two pipes of a vehicle exhaust system. In such an application, ease of installation and removal, as well as cost, are of great importance. Because of the relatively high temperatures and mechanical stresses which occur in vehicle exhaust systems, the coupling must be fabricated from a metal, such as a suitable grade of steel, to provide the requisite strength for a long period of service. In some applications, such as heavy duty truck exhaust systems, the coupling must join relatively large diameter pipes. In some cases one of the pipes takes the form of a flexible metal hose while the other may take the form of a rigid conduit. Other uses for such couplings may include a relatively small metal or plastic water pipes and relatively large drainage and sewage pipes of either plastic or clay materials. Still other applications include joining of structural pipes, as in the case of scaffolds and the like.

BACKGROUND ART

In my U.S. Pat. No. 3,905,623, a pipe coupling is disclosed in which a wide-band sleeve is stretched over adjoining pipe ends to provide a mechanical connection with a fluid seal between the pipes. That patent disclosed a coupling for a pipe lap joint in which the end of at least one of the pipes is specially formed to provide the desired relationship with means for clamping or stretching the outer pipe around the inner pipe. In this coupling, the coupling includes a sleeve having a roundish sector and a channel-shaped sector and force applying means connected with the channel-shaped sector is adapted to stretch the sleeve to form the joint.

A coupling for pipe lap joints is disclosed in my U.S. Pat. No. 4,056,273 which allows two pipes to be joined in telescoping relation without requiring the pipe ends to be specially formed. In this coupling, a wide-band sleeve has a cross section including a roundish sector and a radially projecting channel-shaped sector and is adapted to receive a pipe of one diameter inside one end and a pipe of a larger diameter inside the other end with the pipes being in telescoping relation to form a lap joint. The roundish sector of the sleeve is substantially uniform in diameter throughout its length and hence is oversized with respect to the smaller pipe. A split seal ring encircles the smaller pipe and has an outer diameter about the same as that of the larger pipe. Force applying means is connected with the channel-shaped sector to stretch the sleeve around the pipes. By reason of the split seal ring, the sleeve is stretched circumferentially in a substantially uniform amount along its length into engagement with the outer pipe and the seal ring, respectively, to produce a mechanically strong and fluid tight seal.

It is a general object of this invention to provide a coupling for pipe lap joints having the advantages of a stretched wide-band sleeve, as in the above mentioned patents, but without the need for either specially formed pipe ends or a seal ring for the smaller pipe.

DISCLOSURE OF THE INVENTION

According to this invention, an improved coupling is provided for pipe lap joints. The improved coupling is of the type comprising a sleeve which receives a larger pipe and a smaller pipe in telescoping relation to form a lap joint, the sleeve having a cross section including a roundish sector and a radially projecting channel-shaped sector; force applying means is connected with the channel-shaped sector for stretching the sleeve around the pipes. The improvement, according to this invention, is that the roundish sector of the sleeve comprises first and second end bands with the first being of larger circumference than the second to receive the larger and smaller pipes in loose fitting relation with about the same clearance. With this arrangement, actuation of the force applying means stretches the sleeve around the pipes into direct engagement with both the larger and smaller pipes.

Further, according to the invention, the channel-shaped sector of the sleeve is of the same size throughout the axial length of both end bands, the end bands being of different size to accomodate the different size pipes. A reaction member of uniform cross section is disposed within the channel-shaped sector and the force applying means coacting with the reaction member deforms the channel-shaped sector to stretch the sleeve around the pipes.

Further, according to the invention, the larger end band of the sleeve is axially offset from the smaller end band in a direction away from the channel-shaped sector. Preferably, this offset is a fraction of the difference between the outside diameters of the larger and smaller pipes. According to the invention, the sleeve is provided with a greater capacity for stretching in the vicinity of the channel-shaped sector.

Additionally, according to the invention, the sleeve is made from a sleeve blank having a cross section including a roundish sector and a radially projecting channel-shaped sector by circumferentially stretching one end of the sleeve blank in at least part of the roundish sector while holding the sleeve blank in a zone between said one end and the other end whereby the resulting coupling member or sleeve is adapted to receive pipe ends in a lap joint. Preferably, the sleeve blank is formed with a channel-shaped sector by deforming a tubular member of substantially uniform diameter. Further, the tubular member is made by rolling sheet material with edges in overlapping relation and welding the overlapping edges together. Further, according to the invention, the coupling member may be made by stretching the region of the sleeve opposite the channel-shaped sector to a greater extent than the region contiguous to the channel-shaped sector so that the roundish sector of the larger end of the sleeve is axially offset from the roundish sector of the other end.

Further, according to the invention, the coupling member is made by placing the sleeve blank in an external die having a cavity corresponding to the desired sleeve configuration and stretching the sleeve blank outwardly into engagement with the die cavity by expanding a mandrel within the sleeve blank.

A more complete understanding of this invention may be obtained from the detailed description that follows taken with the accompanying drawings.

BRIEF DESCRIPTION OF THE DRAWINGS

FIG. 1 is a view in elevation of one embodiment of the pipe coupling of this invention.

FIG. 2 is an end view of the coupling of FIG. 1.

FIG. 3 is an elevation view of the coupling in assembled relationship with a pipe lap joint.

FIG. 4 is a view taken on lines 4—4 of FIG. 3.

FIG. 5 is a view in elevation of a second embodiment of the pipe coupling of the invention.

FIG. 6 is a cross sectional view of the pipe coupling of FIG. 5.

FIG. 14 illustrates an apparatus for making the coupling member of the pipe coupling of FIG. 5.

FIG. 15 is a view taken on lines 15—15 of FIG. 14.

FIG. 16 shows a tool for use with the apparatus of FIG. 14.

FIG. 17 shows the forming apparatus in the actuated position.

BEST MODE FOR CARRYING OUT THE INVENTION

Figure 7:
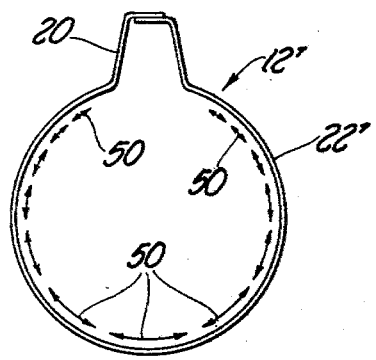
FIG. 7 is a cross sectional view of the coupling of FIG. 5.

Referring now to the drawings, there is shown an illustrative embodiment of the invention in a pipe coupling especially adapted for lap joints which must be mechanically strong and substantially fluid tight. In particular, the invention will be described with reference to an embodiment for vehicle exhaust systems in which the coupling is constructed of steel. It will be appreciated, however, that the invention is useful in a wide variety of applications wherein it is desired to join two pipe ends or two members with roundish ends, whether tubular or solid.

Referring now to FIGS. 1, 2, 3, and 4, the invention is shown in a pipe coupling which is especially adapted for use in vehicle exhaust systems. The coupling 10 comprises a coupling member or sleeve 12 which is adapted to receive a pair of pipes in telescoping relation to form a pipelap joint with the sleeve stretched around the ends of both pipes. As shown in FIG. 3, first and second pipes 14 and 16 are joined together by the coupling 10 in telescoping relation with the smaller pipe 16 inserted into the end of the larger pipe 14. Pipe 14, for the sake of illustration, is a flexible metal hose of known construction as is commonly used in the exhaust systems of heavy duty trucks. The pipe 16 is a rigid pipe or conduit of the type used in such exhaust systems. The pipes 14 and 16 are of circular or roundish (such as slightly oval) cross section and are suitably constructed of a ductile material such as cold rolled steel or stainless steel.

The sleeve 12 of the coupling 10 is constructed of a ductile material, preferably a selected grade of steel. It is desirable to use a material which is capable of undergoing a relatively high degree of elongation without failure. For example, aluminized steel is quite satisfactory where the required elongation is relatively small. In other applications, requiring high degree elongation stainless steel may be used. A steel known as "Aluma-Ti" available from the Inland Steel Company exhibits an elongation property intermediate that of aluminized steel and stainless steel and is suitable for many applications.

The sleeve 12, as best shown in FIG. 2 is for the most part circular or roundish in cross section, it has a roundish sector 18 and a channel-shaped sector 20 which extends outwardly and opens into the roundish sector. The channel-shaped sector 20 is of substantially uniform cross section throughout its length. The roundish sector 18 comprises first and second end bands 22 and 24, the end bank 22 being of larger circumference than the end band 24. Each of the end bands is of substantially uniform cross section throughout its length. The end bands are integrally joined with each other at a narrow circumferentially extending shoulder 26.

The coupling 10 also includes a reaction member or spline 28 which is disposed within the channel-shaped sector 20 and which is adapted to seat upon the outer surface of the walls of pipes 14 and 16. The spline 28 has a surface configuration which forms a continuation of the outer surface of the pipes and may be regarded as a wall-extension sector superimposed upon the walls of the pipes. The spline 28 has an inner surface 30 of arcuate configuration conforming to the outer wall of the pipes 14 and 16. This surface 30 of the spline 28 may be provided with a coating of sealing compound if desired to enhance the fluid seal of the coupling. The spline 28 is provided with a pair of oppositely facing concave surfaces 32 and 34 and a substantially flat surface 36 at the outer end. The spline, as shown in FIG. 2 with the coupling in the untightened condition, fits loosely within the channel-shaped sector and extends as one integral piece substantially throughout the length of the sleeve 12.

The coupling 10 further includes force applying means in the form of a pair of bolts 38 and 40 and respective nuts such as a nut 42 on the bolt 38. The side walls of the channel-shaped sector 20 are provided with openings for passage of the bolts 38 and 40 therethrough and the spline 28 is provided with aligned openings for passage of the bolts. An elongated spacer 44 with openings for the bolts 38 and 40 is disposed between the bolt heads and the outside of the channel-shaped sector 20; similarly, a spacer 46 is disposed between the nuts 42 and the other side of the channel-shaped sector 20. The spacers 44 and 46 have a cross sectional configuration, approximately semicircular, which corresponds with the configuration of the concave surfaces 32 and 34 on the spline.

It is to be noted that the end bands 22 and 24 of the sleeve 12, as shown in FIGS. 1 and 2, are coaxial with each other about a centerline 48. The end band 22, being of larger circumference, has a radius of $R_2$ and the end band 24 has a smaller radius $R_1$ as shown in the untightened condition in FIG. 2. The difference between the radius $R_2$ and the radius $R_1$ is approximately one-half the difference between the outer diameters of the pipes 14 and 16 so that when the coupling 10 is tightened and the sleeve 12 is drawn inwardly the end bands will concurrently seat against the respective pipes.

In order to make a lap joint of a pair of pipes such as pipes 14 and 16, the coupling 10 is slipped over the smaller pipe 16 and the smaller pipe is inserted into the end of the larger pipe 14. The coupling 10, in its untightened condition, is positioned so that the larger pipe 14 extends into the sleeve 12, suitably into abutment with the shoulder 26. The lap joint is completed by tightening the bolts 38 and 40. As the bolts are tightened down, the spacers 44 and 46 are progressively drawn together against the resistance of the side walls of the channel-shaped sector 20. It is noted that in the loose fit condition, with the pipe 14 and the sleeve 12 in an unstressed or relaxed condition, the peripheral length on the inner surface of a cross section of the sleeve 12 through the end band 22 is less than the peripheral length on the outer surface of a cross section taken through pipe 14 and the wall extension thereof provided by the spline 28. Similarly, in this condition the peripheral length on the inner surface of a cross section of the sleeve 12 taken through the end band 24 is less than the perpheral length of the outer surface of the cross section of the pipe 16 and the wall extension thereof provided by the spline 28. In the unstressed or relaxed condition of the sleeve 12, the pipes 14 and 16 have a loose fit with the respective end bands 22 and 24. In order that the end bands may be drawn tight and stretched around the respective pipes, the peripheral length on the inner surface of the cross section of the spline 28 is significantly greater than the opposed peripheral length on the inner surface of the channel-shaped sector 20.

As the tightening of the bolts 38 and 40 progresses, the side walls of the channel-shaped sector 20 are drawn inwardly toward the concave surfaces 32 and 34; accordingly, the sleeve 12 is reduced in radius and circumference and the clearance relative to the pipes 14 and 16 diminishes. When the bolts are fully tightened, the spacers 44 and 46 have drawn the side walls of the channel-shaped sector 20 inwardly into seating engagement with the concave surfaces of the spline 28. To achieve this relationship, the roundish portion of the sleeve 12 and the channel-shaped sector 20 are deformed by tensile stress throughout the length and circumference of the sleeve. This tensile stress in the sleeve imposes a radial pressure on the walls of the pipes 14 and 16 which places them in a state of compressive stress. In other words, the sleeve 12 is stretched over the pipes 14 and 16. This stretching of the sleeve 12 holds the spline 28 radially inwardly so that the bottom surface 30 presses against the walls of the pipes 14 and 16 to exert a radial pressure on the walls of the pipes.

With the coupling fully tightened, as shown in FIGS. 3 and 4, the sleeve 12 provides close fitting surface engagement with the pipes 14 and 16. Also, the bottom surface 30 of the spline 28 is pressed into close fitting surface engagement with the pipes 14 and 16. Accordingly, a strong mechanical joint is provided with substantially fluid tight sealing and with minimum pipe distortion.

In the manufacture of the coupling 10 according to this invention, the sleeve 12 is made from a sleeve blank of uniform circumference by stretching the end band 22 so it is larger than the end band 24. A preferred method of performing this stretching operation will be described below; suffice it to say at this point, the end band 22 is work-hardened by this pre-stressing which results in a higher yield strength with a greater resistance to stretching and a reduced capacity for stretching without rupture or other failure than the end band 24. The end band 22 is pre-stressed in such a way that the stretching is substantially uniform throughout the roundish sector of the end band 22 and as a consequence, so is the residual capacity for stretching. When the coupling 10 is put into use and tightened down as shown in FIGS. 3 and 4, the pre-stressed sleeve 12 is further stressed to stretch it around the pipes 14 and 16 as described above. As the tightening of the bolts 38 and 40 progresses, the frictional engagement of the end band 22 with pipe 14 increases and the frictional engagement of end band 24 with pipe 16 increases. The frictional engagement results in a nonuniform distribution of tensile stresses around the circumference of the end bands 22 and 24. In particular, the tensile stress diminishes with the circumferential distance away from the channel-shaped sector 20. As a result, both end bands 22 and 24 are subjected to greater stretching in the region adjacent the channel-shaped sector 20 than in the region opposite the channel-shaped sector 20. When the bolts 38 and 40 are both fully tightened as depicted in FIG. 4, there will be a concentration of stress in the vicinity of the channel-shaped sector 20 and because of the pre-stressing of the end band 22, the stresses therein will be higher than in end band 24; nevertheless the stress may be kept well below the ultimate strength of the material. However some applications may require the use of highly ductile steel for the sleeve 12 because of the stress concentrations that occur in the vicinity of the channel-shaped sector 20. A significantly improved stress distribution in the sleeve is obtained in the embodiment of the invention which will now be described with reference to FIGS. 5, 6, 7 and 8.

In the embodiment of the invention shown in FIGS. 5, 6, 7, and 8, the coupling is of the same structure as the embodiment of FIGS. 1 and 2 except for the relationship of the end bands of the sleeve. In describing this embodiment, like parts will be designated by like reference characters; as to the sleeve, the reference characters applied in FIGS. 1 and 2 will be used with a prime symbol in FIGS. 5, 6, 7 and 8.

The embodiment of the invention in the pipe coupling 10' of FIGS. 5 and 6 differs from that of FIGS. 1 and 2 by the structure of the sleeve 12'. The sleeve 12' comprises a pair of end bands 22' and 24' which are integrally joined by a shoulder 26'. The end band 22' is of larger circumference than end band 24' and is axially offset from the end band 24'. In particular, the centerline 48'' of the end band 24' is offset in a direction opposite from the channel-shaped sector 20. The end band 22' has a radius $R_2$ and the end band 24' has a radius $R_1$ with the difference between the radii being about one-half the difference between the outside diameters of the pipes 14 and 16. The offset distance between the centerlines 48' and 48'' is preferably about one-half the difference between the radii $R_1$ and $R_2$. Accordingly, the inside surfaces of the end band 22' and the end band 24', in the vicinity of the channel-shaped sector 20, have a smaller offset from each other than the inside surfaces in the region opposite the channel-shaped sector 20.

The coupling 10', as shown in FIGS. 5 and 6 is used to make a pipe lap joint in the same manner as described with reference to the coupling 10 of FIGS. 1 and 2. When the bolts 38 and 40 are tightened down, the sleeve 12' is stretched around the pipes being joined as described above. Due to the frictional effect of the surface engagement of the end bands 22' and 24' with the respective pipes, the stresses will be nonuniformly distributed about the circumference of the respective end bands. As a result, there will be a concentration of stress in the vicinity of the channel-shaped sector 20 and a greater degree of stretching of the end bands 22' and 24' will occur in that region. In order to avoid excessive elongation or stretch in that region, the sleeve is made by a special method in accordance with this invention, as will be described in detail below. Suffice it to say at this point, the sleeve 12' is made from a sleeve blank of uniform diameter by pre-stressing it to stretch one end to a larger circumference so that it is eccentric relative to the other end. More particularly, the sleeve blank is stretched at one end to enlarge the circumference of the roundish sector with the centerline thereof being moved away from the channel-shaped sector by the stretching operation.

Figure 8:
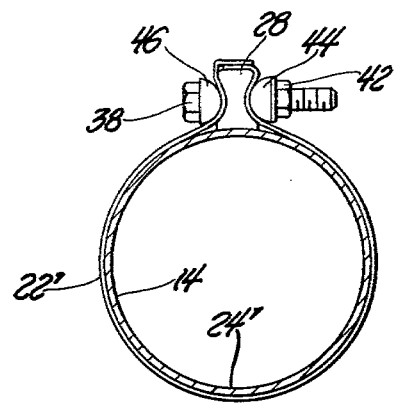
FIG. 8 shows the coupling of FIG. 5 in assembled and tightened condition.
Figure 9:
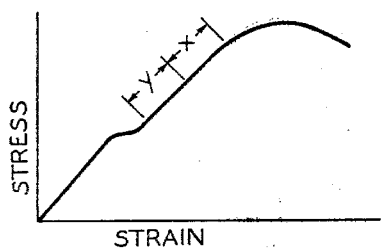
FIG. 9 is a diagram for explanatory purposes.

In the sleeve 12' the end band 22' has a nonuniform capacity for stretching about its circumference, as a result of the pre-stressing operation. This is depicted in FIG. 7 wherein the double-headed arrows 50 have a length indicative of the relative amount of pre-stressing of the end band 22'. The result of the pre-stressing of the end band 22' is also illustrated on the stress-strain diagram of FIG. 9. Note that the lower region (as viewed in FIG. 7) is stressed to a range of values X and the upper region is stressed to a range of values Y, as shown in FIG. 9. Thus, the end band 22' has a higher resistance to stretching in the lower region than in the upper region. When the coupling 12' is put into use and tightened around the pipes, such as pipes 14 and 16, there is a concentration of stress in the region adjacent the channel-shaped sector 20. This stress concentration and the lesser resistance to stretching in that portion of the end band 22' causes it to be stretched to a greater degree than the remainder of the end band 22'. Since that region of the end band has not undergone as much previous stretching, the desired degree of stretching onto the pipe may be achieved without developing excessive strain at any point in the end band 22'. Thus, the pre-forming of the sleeve 12' in this manner permits use of a sleeve material having a smaller percentage maximum elongation for a given application of the coupling since the stretching of the end band 22' is made more nearly uniform by the pre-stressing of the lower region and the subsequent stressing of the upper region when the coupling is tightened as shown in FIG. 8.

Figure 12:
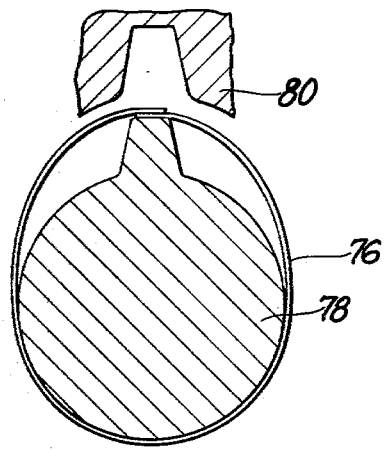
Figure 13:
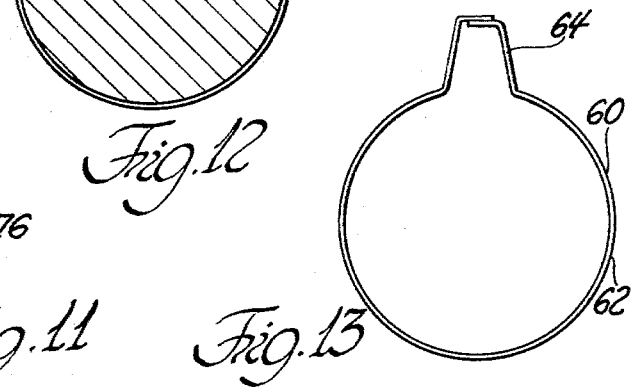

The method of making the coupling of this invention will now be described with reference to FIGS. 10 through 17. In particular, this invention includes a method for making the sleeve 12 of the coupling 10 (as shown in FIGS. 1 and 2) and for making the sleeve 12' of the coupling 10' (as shown in FIGS. 5 and 6). As described briefly above, the sleeves 12 and 12' are preferably made from a sleeve blank. As shown in FIG. 13, a sleeve blank 60 comprises a roundish sector 62 of uniform circumference and a channel-shaped sector 64 of uniform dimensions throughout its length. The method of making sleeve blank 60 will be described with reference to FIGS. 10, 11, and 12.

Figure 10:
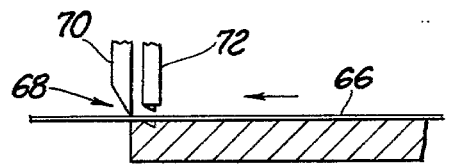
FIGS. 10, 11, 12, and 13 illustrate the preliminary steps of making a sleeve blank for forming the pipe coupling.
Figure 11:
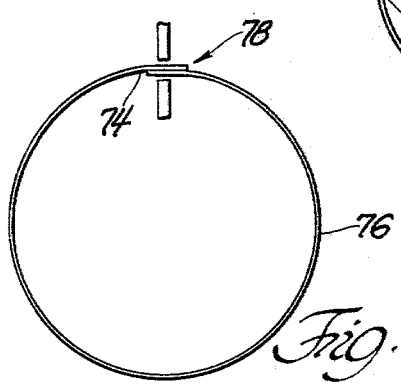

As shown in FIG. 10, a sheet metal strip 66 of desired width is cut to length in a sheet metal shear 68. The shear includes a cut off blade 70 and lancing die 72 which produces a pair of space locating tabs 74 at a fixed distance from the end of the workpiece. As shown in FIG. 11, the workpiece is formed into a cylinder 76 with the ends in overlapping relation with one end seated against the tabs 74 to establish the extent of overlap. The ends are spot-welded together by a resistance welder 77. As shown in FIG. 12, the cylinder 76 is formed into the sleeve blank 60 by a press including an inner die 78 and outer die 80 which coact to deform the cylinder 76 into the configuration of the inner die 78. In deforming the cylinder 76 to form the die blank 60 it is stressed so that it holds a shape corresponding to the inner die member 78.

The sleeve 12' of FIGS. 5 and 6, is made from a sleeve blank 60 by a method which will now be described with reference to FIGS. 14, 15, 16, and 17. The sleeve blank 60 according to this method is formed by holding the sleeve in a zone between its ends and circumferentially stretching one end of the sleeve, the stretching being effected so that region of the sleeve opposite the channel-shaped sector is stretched to a greater extent than the region adjacent to the channel-shaped sector so that the roundish sector of the first end of the sleeve is axially offset from the roundish sector of the other end. Apparatus for performing the stretching operation comprises an outer die block 82 defining a die cavity extending through the block. The die cavity has a wall configuration which corresponds substantially to the outer surface configuration of the sleeve 12' of FIGS. 5 and 6. As such, the die cavity includes a smaller cavity at one end having a cross section including a first roundish die sector 86 and a channel-shaped die sector 98. The cavity also includes a larger cavity with a cross section including a second roundish die sector 90 and the channel-shaped sector 98. The die sector 90 is of larger circumference than the die sector 86. In the illustrative embodiment the die sectors 86 and 90 are circular in cross section and the centerline 94 of the die sector 90 is axially offset downwardly (as viewed in FIG. 15) from the centerline 96 of the die sector 86. The die sector 98 is connected with the die sectors 86 and 90 and is of uniform cross section throughout the length of the die cavity. The smaller die sector 86 and the larger die sector 90 are connected together by a shoulder 100 which extends in a narrow belt-like area around the cavity.

The sleeve stretching apparatus also includes an expanding mandrel 102. The mandrel 102 comprises a plurality of identical mandrel segments 104, 106, 108, 110, and 112, and an additional mandrel segment 114. The mandrel segments 104, 106, 108, 110, and 112, are pie-shaped segments of equal angular extent, with arcuate outer surfaces and radial side surfaces. The segment 114 is also pie-shaped and of larger angular extent than the other segments. Segment 114 has an outer surface with arcuate sectors 115 and 117 and a rectangular sector 116 disposed between the arcuate sectors. The sectors 115 and 117 are joined to the sector 116 at corners or fillets 119 and 121. Each of the segments 104, 106, 108, 110, and 112, has a truncated inner end with flat ramp surfaces 105, 107, 109, 111 and 113, respectively, extending longitudinally from one end of the segment to the other. The segment 14 also has a truncated inner end with a longitudinally extending stepped surface. As shown in FIG. 15, the stepped surface comprises sections 118, 120, and 122, which extend axially of the mandrel and which are connected by ramp surfaces 124 and 126 which are inclined relative to the axis of the mandrel. It is noted that the ramp surfaces 124 and 126 are inclined at the same angle relative to the axis of the mandrel and that the angle of inclination is greater than the angle of the ramp surfaces 105, 107, 109, 111, and 113, of the other segments. When all of the mandrel sectors are nested together as depicted in FIG. 14, the sectors define a central passage 130 which is adapted to receive an actuating member 132 which is shown in FIG. 16 and will be described below. With the mandrel segments nested as depicted in FIG. 14 and 15, the mandrel has a smaller end portion 134 having a cross section including a first roundish mandrel sector 133 and a radially projecting rectangular mandrel sector 116. The mandrel has a larger end portion 136 having a cross section including a second roundish mandrel sector 137 and the radially projecting rectangular mandrel sector 116. The smaller mandrel portion 134 and large mandrel portion 136 are separated by a shoulder 135. The centerline of mandrel portion 136 is offset from the centerline of mandrel portion 134 in a direction away from the rectangular sector 116. With the mandrel positioned within the die cavity the centerline of the larger mandrel sector 136 coincides with the centerline 94 of the cavity 90 and the centerline of the smaller mandrel 134 coincides with the centerline 96 of the cavity 86. As shown in FIGS. 14 and 15, the sleeve blank 60 may be inserted into the die cavity 84 in a loose fitting engagement with the smaller die sector 86 and with a substantial gap or clearance from the larger die sector 90. The mandrel may be inserted within the sleeve blank 60 in a loose fitting engagement of the larger mandrel sector 136 and with a substantial gap or clearance between the sleeve and the smaller mandrel sector 134.

The actuating member 132 for the stretching apparatus is shown in FIG. 16. The actuating member comprises a head 140 suitably of cylindrical shape, adapted to be mounted upon the ram of a press. A cam or wedge member 142 extends axially from the head 140 and is adapted to engage the inner surfaces of the segments of the mandrel 102. The wedge member 142 is provided with five ramp surfaces 144, 146, 148, 150, and 152, which are of the same configuration and are adapted to coact with the inner surfaces 105, 107, 109, 111, and 113, respectively, of the mandrel 102. The wedge member 142 is also provided with a channel 154 between the ramp surfaces 144 and 152 which is adapted to coact with the inner surface of the mandrel sector 114. The channel 154 has stepped bottom surfaces 156, 158, and 160, which extend parallel to the axis of the member 142. A ramp surface 162 joins the surfaces 156 and 158 and a ramp surface 164 joins the surfaces 158 and 160. The ramp surfaces 162 and 164 are adapted to coact with the ramp surfaces 126 and 124 respectively in the mandrel 102. The ramp surfaces 162 and 164 have an inclination relative to the axis of the wedge member 142 which is substantially greater than the angle of inclination of the wedge surfaces 144, 146, 148, 150, and 152 relating to the axis of the wedge member.

In operation of the stretching apparatus, the sleeve blank 60 is disposed within the die cavity with the mandrel in place as shown in FIGS. 14 and 15. To stretch the sleeve blank, the wedge member 142 is pressed axially into the passage 130 of the mandrel 102. This causes, the ramp surfaces 162 and 164 to engage the corresponding ramp surfaces 126 and 124 of the mandrel and the remaining ramp surfaces of the wedge member 142 to engage the corresponding ramp surfaces on the mandrel. The mandrel segment 114 is moved outwardly at a greater rate than the remaining mandrel segments due to the greater angle of the ramp surfaces. This movement of the sector 114 results in initial clamping of the sleeve blank 60 between the corners 99 and 119 and the corners 101 and 121 of the die cavity and mandrel. It also results in initial clamping of the die blank 60 along a narrow circumferential band between the shoulders 100 and 135 of the die cavity and the mandrel over the arcuate surface of the mandrel segment 114. Thus, the die blank is initially held in place in the region of the channel-shaped sector 64 including that part which is opposite the arcuate portions of the mandrel segment 114. As the wedge member 142 is pressed into the mandrel 102 the ramp surfaces 144, 146, 148, 150, and 152 coact with the corresponding inner surfaces of the mandrel segments 104, 106, 108, 110, and 112, and these segments move outwardly in unison. Thus, the deformation of the sleeve blank 60 continues until it is pressed against inner surfaces of the die cavity. This condition is depicted in FIG. 17. Accordingly, the coupling sleeve 12', as depicted in FIGS. 5 and 6, is formed with the end band 22' being of larger circumference than the end band 24' and with the centerline 48' of the end band 22' being axially offset from the centerline 48" of the end band 24'.

It will now be apparent that the coupling sleeve 12, depicted in FIGS. 1 and 2, is made by the same method as the coupling sleeve 12' with one exception. The exception is that the stretching apparatus of FIGS. 14, 15, and 16 is made so that the larger and smaller die cavities 90 and 86, respectively, are coaxial with each other and the larger and smaller mandrel portions 136 and 134, respectively, are coaxial with each other. In this arrangement the centerlines 94 and 96 coincide with each other rather than being axially offset. This, of course, results in a coupling sleeve 10 in which the larger end band 22 has the same centerline as the smaller end band 24, as depicted in FIGS. 1 and 2.

Although the description of this invention has been given with reference to a particular embodiment, it is not to be construed in a limiting sense. Many variations and modifications will now occur to those skilled in the art. For a definition of this invention reference is made to the appended claims.

What is claimed is:

1. In a pipe coupling of the type comprising a sleeve adapted to receive a pipe of one diameter inside one end and a pipe of a larger diameter inside the other end with the pipes being in telescoping relation to form a lap joint; said sleeve having a cross section including a roundish sector and a radially projecting channel-shaped sector, force applying means connected with the channel-shaped sector and adapted to act on the sleeve for deforming the sleeve to change the cross sectional dimensions thereof, the improvement wherein said sleeve is a unitary piece of sheet metal, the roundish sector of said sleeve comprises first and second end bands, the first end band being of larger circumference than the second end band and having a thinner wall than the second end band in at least a portion thereof diametrically opposite the channel-shaped sector, whereby said sleeve receives said pipes in loose fitting relation with about the same clearance at both ends and actuation of the force applying means stretches said sleeve around said pipes.

2. The invention as defined in claim 1 wherein said channel-shaped sector is the same size throughout the axial length of both end bands.

3. The invention as defined in claim 2 wherein said first end band has lesser capacity for stretching in at least part thereof than the capacity for stretching of the second end band.

4. The invention as defined in claim 1 wherein said first end band is axially offset from the second end band in a direction away from said channel-shaped sector.

5. The invention as defined in claim 4 wherein the first end band has a greater resistance to stretching in the region opposite said channel-shaped sector than it has in the region adjacent said channel-shaped sector whereby actuation of said force applying means causes more stretching of the roundish sector in the region adjacent the channel-shaped sector.

6. The invention as defined in claim 4 or 5 wherein the channel-shaped sector is the same size throughout the axial length of both end bands.

7. The invention as defined in claim 6 wherein said channel-shaped sector has a lesser resistance to stretching than that part of the roundish sector of said first end band which is remote from the channel-shaped sector.

8. The invention as defined in claim 1 wherein the first end band has a wall portion opposite the channel-shaped sector which has a higher yield strength and smaller wall thickness than the wall portion immediately adjacent said channel-shaped sector.

9. The invention as defined in claim 1 wherein the first end band has a wall portion immediately adjacent the channel-shaped sector which has a lesser resistance to stretching and a greater capacity for stretching than the wall portion opposite the channel-shaped sector.

* * * * *